Sept. 16, 1952      J. HAHN      2,610,651
PIPE TESTING MACHINE
Filed Oct. 23, 1947      2 SHEETS—SHEET 1
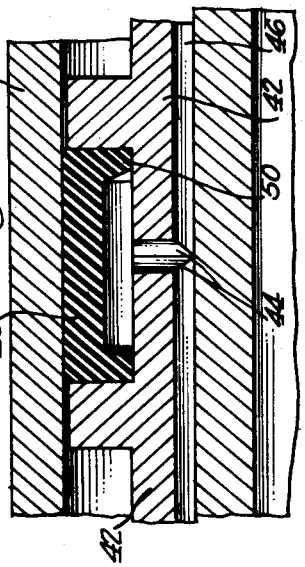
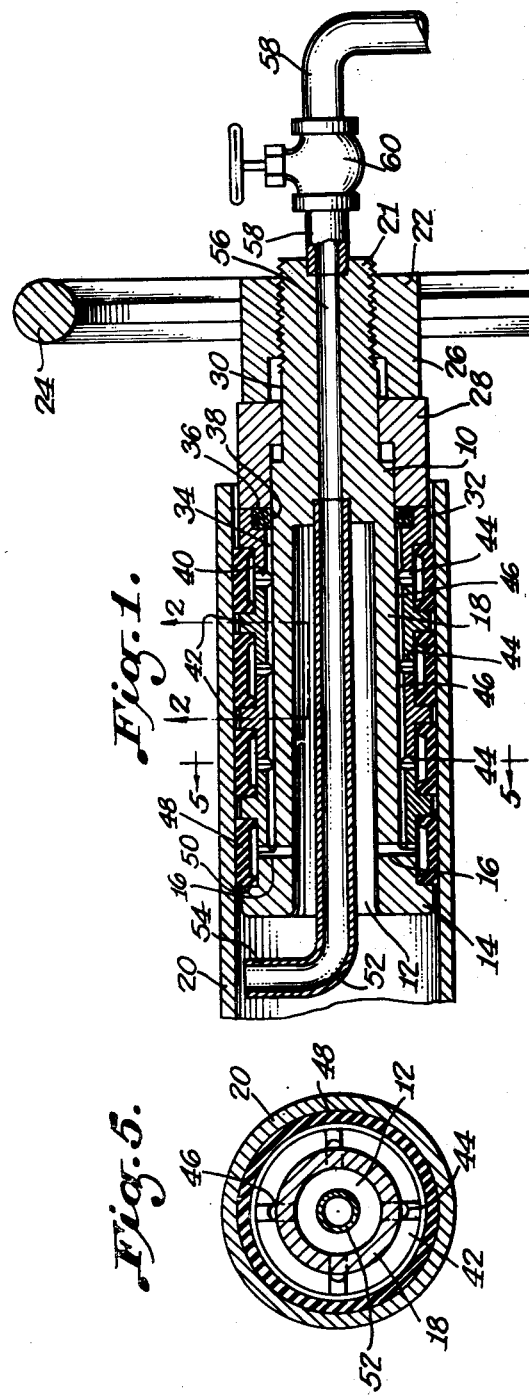
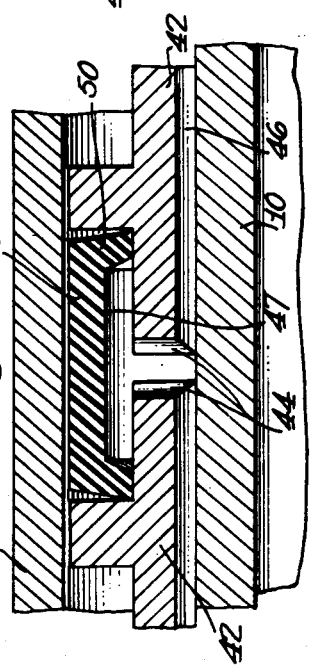
Inventor:
JOHANN HAHN
By Kuny & Koster
Attorneys.

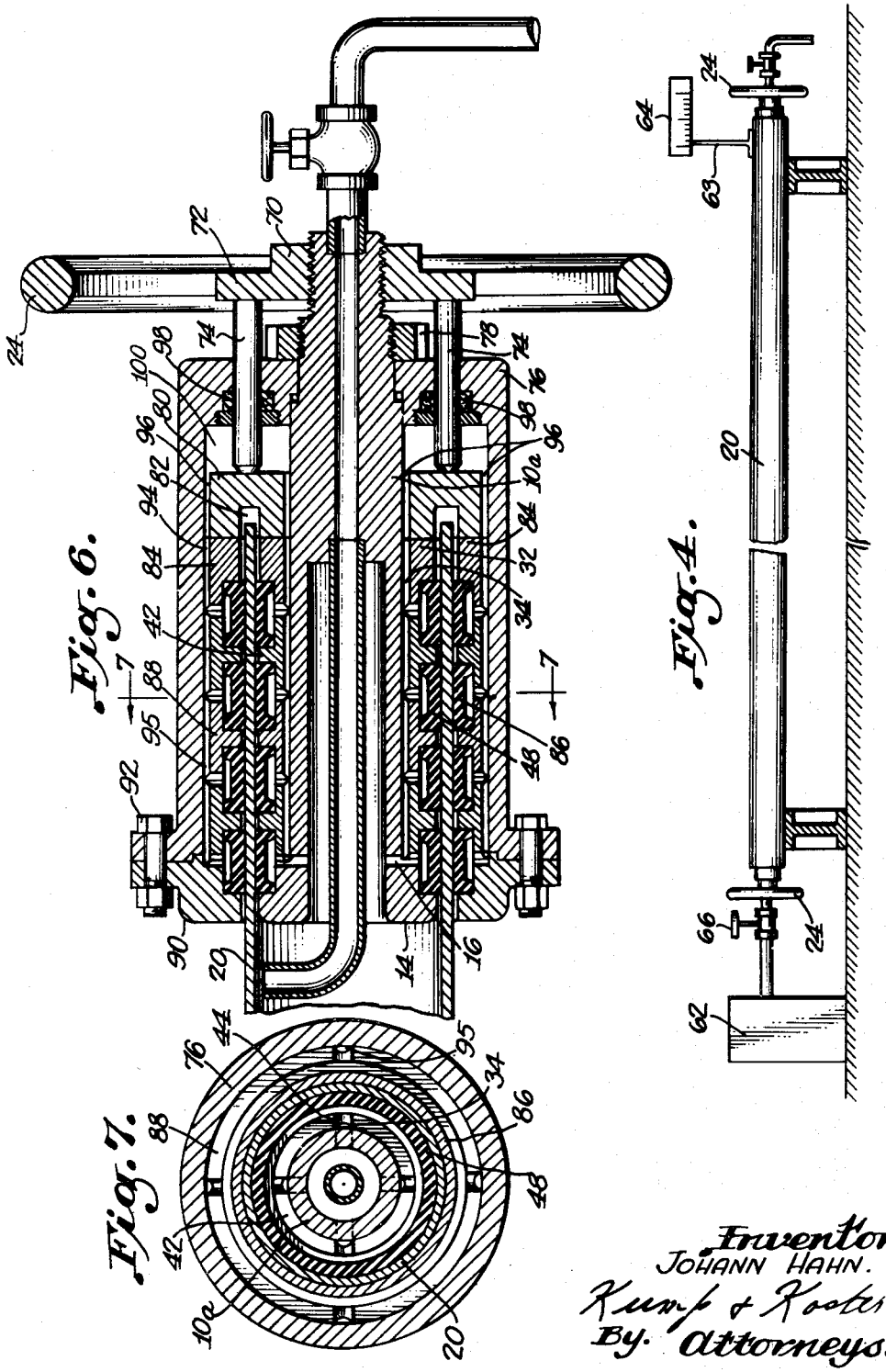

Patented Sept. 16, 1952

2,610,651

UNITED STATES PATENT OFFICE 2,610,651

PIPE TESTING MACHINE

Johann Hahn, Brooklyn, N. Y.

Application October 23, 1947, Serial No. 781,603

9 Claims. (Cl. 138—90)

The present invention relates to a novel pipe testing machine capable of simulating the pressure conditions to which pressure pipe is subjected in the field.

Conventional pipe testing machines are generally structures of considerable weight and of complicated design. The type of pipe testing machine most generally in use at the present time has two seats which are pressed against each end of the pipe to be tested. One seat is moved against the pipe by a number of hydraulically operated plungers, all or some of which, depending on the size of the pipe to be tested, may be activated. The other seat is held against the other end of the pipe by tension rods which take up the reaction of the pipe against the seats. Suitable valves and orifices are provided to fill the pipe with testing water and to empty it.

Pipe testing machines of this conventional type have a number of significant and inherent disadvantages. The more important of these is due to the requirement that the pipe to be tested be placed under heavy longitudinal compressive stresses to secure adequate sealing at the ends. As a result of this requirement, the length of pipe section that can be tested is limited by its slenderness ratio, which must not be so great as to permit buckling stresses to be created. Furthermore, transverse cracks are not permitted to develop or become noticeable because the force applied to the ends of the pipe section tends to close such cracks. Other important disadvantages of such machines are their high initial cost, great structural weight, immobility, and the difficulty of equalizing the pressures exerted by the pressure plungers against the movable seat.

In accordance with the present invention the two ends of a pipe section are sealed by independent plug assemblies having one or more elastic sealing rings pressed against the walls of the pipe section by a combination of mechanical force and fluid pressure. The construction of the plug assemblies is such that the force with which the sealing rings are pressed against the walls of the pipe section creates sufficient friction between the rings and the walls to retain the plug assemblies in the pipe section against the longitudinal component of the fluid pressure within the pipe tending to expel the plug assemblies therefrom. The fluid pressure applied to the sealing rings is a direct function of the fluid pressure in the pipe. Consequently, the frictional resistance of the plug assembly to expulsion from the pipe section increases with an increase in fluid pressure.

The use of these plug assemblies enables the pipe section to be tested under exactly the same conditions as those encountered in the field, although in a quantitative way these stresses may be multiplied. Thus, for example, the pressure of the testing fluid within the pipe section during the test may be a multiple of that which the pipe section is designed to withstand in the field. During the test, however, the pipe section need not be subjected to longitudinal compressive stresses that are not encountered in the field and which would tend to minimize or eliminate the detection of transverse flaws or cracks in the pipe.

One of the advantages of the present invention, therefore, is that it provides a machine for testing pipe sections under the kind of conditions to which they are subjected in actual use.

An ancillary advantage of the invention is that it provides a machine for testing pipe sections in a manner that will reveal faults hitherto undetectable by conventional pipe testing apparatus.

A still further advantage is that it provides pipe testing apparatus that requires no foundation, such as of concrete or the like, and therefore enables tests to be carried out in the field.

These and other advantages, as well as the utility of the invention, will become apparent from the following description and from the accompanying figures of drawing wherein:

Figure 1 is a view in longitudinal section through one portion of one embodiment of the pipe testing apparatus of this invention;

Figure 2 is a detailed section, on an enlarged scale, through section 2—2 of Figure 1 showing several cooperative elements of a plug assembly in position in a pipe section prior to the application of mechanical and fluid pressure;

Figure 3 is a similar detailed view showing the positions of the same elements after the application of machanical and fluid pressure;

Figure 4 is a view in horizontal elevation of a pipe testing set-up in accordance with the present invention;

Figure 5 is a sectional view taken along section line 5—5 of Figure 1 looking in the direction of the arrows;

Figure 6 is a view in longitudinal section through one portion of another embodiment of the pipe testing apparatus; and Figure 7 is a view in cross section taken along section line 7—7 of Figure 6 looking in the direction of the arrows.

As shown in Figure 1, a recessed plug member 10 having a recess 12, a head 14, one or more radial fluid passageways 16 and a section 18 of reduced diameter, is adapted to fit within one end of a pipe section 20. The exterior end 21 of said plug member 10 is threaded to receive a hub section 22 of a hand wheel 24. The interior end 26 of the hub section 22 bears against an annular follower 28 slideable longitudinally on the bearing portion 30 of the plug member 10. The follower 28 in turn bears against an annular pressure transmitting member 32 provided with one or more grooves 34. An annular sealing gasket 36 is provided between the follower 28, the pressure transmitting member 32, and the cylindrical surface 38 of the plug member 10. The interior surface of the pressure transmitting member 32 is provided with a radial grooved portion 40. One or more annular pressure transmitting members 42 of T-shape cross section having radial grooves 44 and longitudinal grooves 46 are provided around the plug member 10, as shown for example in Figure 1. A sealing ring 48 of resilient material, preferably having a high coefficient of static friction and preferably provided with rim sections 50, is disposed between each two of the annular pressure transmitting members 42, between the outermost annular pressure transmitting member 42 and the pressure transmitting member 32 bearing against the follower 28, and between the innermost annular pressure transmitting member 42 and the head 14.

The recess 12 of the plug member 10 is provided with a discharge pipe 52 having an upstanding opening 54 adjacent the wall of the pipe section 20 and communicating by way of central passage 56 with a discharge pipe 58 provided with a hand valve 60.

The device inserted into the other end of the pipe section to be tested is similar in all details except that the discharge pipe 58 can be eliminated and the central passage 56 is connected to a source of fluid pressure 62 as shown in Figure 4. If desired, an indicator arm 63 may be attached to one end of the pipe section to be tested so that the increase in length of the pipe section while under pressure may be measured on a scale 64 which may, if desired, be provided with a multiplying device.

In operation, the plug assembly including the plug member 10, one or more resilient sealing rings 48, an appropriate number of annular pressure transmitting members 42, one annular pressure transmitting member 32, the follower 28, and the handwheel 24, is inserted into each end of the pipe section to be tested. One of these plug assemblies is provided with discharge pipes 52 and 58 and a hand valve 60 and the other is connected to a source of fluid pressure 62. At this stage of the operation the relative positions of the plug assembly elements and the interior wall of the pipe section are substantially as shown in Figure 2.

Each handwheel 24 is then rotated so as to move hub section 22 inwardly toward the pipe section 20 with the result that the follower 28 is pressed against the annular pressure transmitting member 32 which in turn presses against the annular pressure transmitting members 42 until they make contact with each other and with the head 14 of the plug member 10. When this has been accomplished the relation of the plug assembly elements is substantially as illustrated in Figure 3. In this position the resilient sealing rings 48 are compressed longitudinally so as to be forced against the interior wall of the pipe section 20 and the rim sections 50 of the sealing rings 48 are pressed against the upstanding flanges of the annular pressure transmitting members 32 and 42 and head 14 so as to form fluid tight seals therewith. The groove sections 40 and 44 of the pressure transmitting members 42 and 32, however, remain open and in communication with recess 12 by way of radial fluid passageways 16 and longitudinal grooves 46.

When both plug assemblies have thus been inserted into the ends of the pipe section 20, the valve 66 communicating with source of fluid pressure 62 is opened so as to fill the pipe section 20 with pressure fluid, the discharge valve 60 likewise being open so that the air within the pipe section may escape through discharge pipes 52 and 58. As soon as the fluid in the pipe section 20 completely fills the pipe section it will begin to be discharged through discharge pipe 58 whereupon the discharge valve 60 is closed. The valve 66 is then left open until the desired fluid pressure is attained within the pipe section 20 whereupon it likewise may be closed.

The force of the fluid pressure within the pipe section tending to push the plug assemblies out of the ends of the pipe section is utilized to more firmly retain said assemblies therein. The fluid pressure passes through fluid passageways 16 and the fluid passageways formed by grooves 40, 44, and 46, to bear against the inner surfaces 47 of the resilient sealing rings 48 to thus increase the pressure between the sealing rings and the interior surface of the pipe section. Since no compressive stresses are exerted against the opposite ends of the pipe section 20, it is free to extend in a longitudinal direction and thereby to expose and render detachable transverse as well as longitudinal flaws in the pipe. This also makes it possible to measure the elongation of the pipe section under a predetermined fluid pressure.

The modification illustrated in Figures 6 and 7 operates on the same principle as that described with reference to the modification illustrated in Figures 1 to 5. The plug member 10a fitting within the pipe section 20, the resilient sealing rings 48, and the annular pressure transmitting members 32 and 42 are substantially similar to those described previously. The hub section 70 of the handwheel 24, however, is of a simple flange type wherein the flange 72 bears against a plurality of compression bars 74 which pass through and are longitudinally movable within an annular housing 76. The compression bars 74 in turn bear against an annular follower 80, recessed at 82 to accommodate the thickness of the pipe wall, and said follower 80 in turn bears against exterior and interior annular pressure transmitting members 32 and 84 respectively. A resilient sealing ring 86, similar in cross section to the sealing rings 48 inside the pipe section, is disposed between each of the annular pressure transmitting members 88, between annular pressure transmitting members 84 and 88, and between the innermost annular pressure transmitting member 88 and an external head 90 suitably bolted to the inner end of the annular housing 76 by means of bolts 92 or the like. The pressure transmitting members 84 and 88 and the follower 80 are provided with groove sections 94, 95, and 96, communicating with radial grooves 16 in the plug member 10a.

Sealing gaskets 98 are provided around the openings in the outer end of the annular housing 76 through which the compression bars 74 pass and a nut 78 may be provided to assist in retaining the housing 76 and the plug member 10a in their relative positions.

In operation, a plug assembly such as that illustrated in Figures 6 and 7 is inserted into each end of the pipe to be tested. When this apparatus is in place the handwheel 24 is turned until the various pressure transmitting members become locked. In this position, as in that shown in Figure 3, each of the resilient sealing rings 48 and 86 is forced, by mechanical pressure, against the inner or outer wall, respectively, of the pipe section. When fluid pressure is applied to the interior of the pipe section in the manner described previously, it is transmitted to each of the resilient sealing rings 48 and 86 by way of radial passageways 16 and 44, longitudinal passageways 46, 94, 95 and 96, and the recess 100 in the annular housing 76.

It is to be understood that innumerable alterations and modifications will occur to those skilled in the art upon reading the foregoing description of the invention. Thus, for example, the number of resilient sealing rings, their relative width, their precise cross section, the shape of the annular pressure transmitting members, the details of construction of the plug assemblies, the arrangement for the application of fluid pressure, the manner of measuring the elongation of the pipe section while under pressure, and many other details may be altered considerably without departing from the principles of this invention. It is to be understood, therefore, that all such modifications and alterations, of which the foregoing are only a few, come within the scope of the invention as defined in the following claims.

I claim:

1. A plug assembly for testing pipes under fluid pressure comprising a plug member adapted to fit within a pipe section, said member having a head and a pasageway open at one end to fluid within said pipe section, an annular housing attached to said plug member at one end and spaced therefrom throughout most of its length, said housing being provided with a separate head, a plurality of inner annular pressure transmitting members disposed around said plug member and adapted to fit within said pipe section, resilient sealing rings having inwardly projecting rim sections and disposed around said plug member and in alternate series with said inner pressure transmitting members, a plurality of outer annular pressure transmitting members disposed within said housing and adapted to fit around said pipe section, resilient outer sealing rings having outwardly projecting rim sections disposed within said housing and in alternate series with said outer pressure transmitting members, means for moving said inner and outer pressure transmitting members toward said heads to cause the pressure members to press against said rim sections and deform the sealing rings and press them against the interior and exterior walls of said pipe section, said passageway being adapted to transmit fluid pressure within said pipe section to said sealing rings to supplement the pressure thereof against the walls of the pipe section, and a closable opening in said plug member for the passage of fluid therethrough.

2. A plug assembly for testing pipes under fluid pressure comprising a plug member adapted to fit within a pipe section, said member having a head and a passageway open at one end to fluid within said pipe section, a plurality of annular pressure transmitting members disposed around said plug member and adapted to fit within said pipe section, resilient sealing rings disposed around said plug member and in alternate series with said pressure transmitting members, said sealing rings having inwardly projecting rim sections, and means for moving said pressure transmitting members toward said head to cause the pressure transmitting members to press against said rim sections and deform the sealing rings and press their outer surfaces against the interior wall of said pipe section, said passageway in said plug member communicating with the inner surfaces of said sealing rings to transmit fluid pressure within said pipe section to said sealing rings to supplement the pressure thereof against the inner wall of the pipe section.

3. A plug assembly for testing pipes under fluid pressure comprising a plug member adapted to fit within a pipe section, said member having a head at one end, a plurality of annular pressure transmitting members disposed around said plug member and adapted to fit within said pipe section, resilient sealing rings disposed around said plug member and in alternate series with said pressure transmitting members, and means for moving said pressure members toward said head to deform the sealing rings and press their outer surfaces against the interior wall of the pipe section, and a passageway in said plug member communicating with the inner surface of said rings to transmit fluid pressure within said pipe section to said sealing rings to supplement the pressure thereof against the inner wall of said pipe section.

4. A plug assembly for testing pipes under fluid pressure comprising a plug member adapted to fit within a pipe section, said member having a head and a passageway open at one end to fluid within said pipe section, a plurality of annular pressure transmitting members disposed around said plug member and adapted to fit within said pipe section, resilient sealing rings disposed around said plug member and in alternate series with said pressure transmitting members, and means for moving said pressure transmitting members toward said head to deform the sealing rings and press their outer surfaces against the interior wall of the pipe section, said passageway communicating with the inner surfaces of the sealing rings to trasmit fluid pressure within said pipe section to the sealing rings to supplement the pressure thereof against the interior wall of the pipe section.

5. A plug assembly for testing pipes under fluid pressure comprising a plug member including a housing having an open end adapted to fit around the end of a pipe section, said member having a head at the open end and a passageway open at one end to fluid within said pipe section, a plurality of annular pressure transmitting members disposed within said housing and adapted to fit around said pipe section, resilient sealing rings disposed within said housing and in alternate series with said pressure transmitting members, said sealing rings having outwardly projecting rim sections, and means for moving said pressure transmitting members toward said head to cause the pressure transmitting members to press against said rim sections and deform the sealing rings and press their inner surfaces against the outer wall of the pipe section, said passageway communicatng with the outer surfaces of said sealing rings to transmit fluid pressure within said pipe section to said sealing rings to supplement the pressure thereof against the outer wall of the pipe section.

6. A plug assembly for testing pipes under fluid pressure comprising a plug member adapted to fit within a pipe section, said member having a head and a passageway open at one end to fluid within said pipe section, an annular pressure transmitting member disposed around said plug member and adapted to fit within said pipe section, a resilient sealing ring disposed around said plug member and between said head and said pressure transmitting member, and means for moving said pressure transmitting member toward said head to deform the sealing ring and press the outer surface thereof against the interior wall of the pipe section, said passageway communicating with the inner surface of the sealing ring to transmit fluid pressure within the pipe section to the sealing ring to supplement the pressure thereof against the interior of the pipe section.

7. A plug assembly for testing pipes under fluid pressure comprising a plug member for a pipe section, said member having a head and a passageway open at one end to fluid within said pipe section, an annular pressure transmitting member concentrically disposed relative to said plug member, a resilient sealing ring disposed between said head and said pressure transmitting member, and means for moving said pressure transmitting member toward said head to deform the sealing ring and press one of the peripheral surfaces thereof against a wall of said pipe section, sad passageway communicating with the other of said peripheral surfaces of said sealing ring to transmit fluid pressure within said pipe section to said sealing ring to supplement the pressure thereof against a wall of the said pipe section.

8. A plug assembly for testing pipes under fluid pressure comprising a plug member adapted to fit within a pipe section, said member having a head and a passageway open at one end to fluid within said pipe section, an annular housing attached to said plug member at one end and spaced therefrom throughout most of its length, said housing being provided with a separate head, an inner annular pressure transmitting member disposed around said plug member and adapted to fit within said pipe section, a resilient sealing ring having an inwardly projecting rim section disposed around said plug member, an outer annular pressure transmitting member disposed within said housing and adapted to fit around said pipe section, a resilient outer sealing ring having an outwardly projecting rim section disposed within said housing, means for moving said inner and outer pressure transmitting members toward said heads to cause the pressure members to press against said ring sections and deform the sealing rings and press them against the interior and exterior walls of said pipe section, said passageway being adapted to transmit fluid pressure within said pipe section to said sealing rings to supplement the pressure thereof against the walls of the pipe section, and a closeable opening in said pipe member for the passage of fluid therethrough.

9. A plug assembly for testing pipes under fluid pressure comprising a plug member including a housing having an open end adapted to fit around an end of a pipe section, said member having a head at the open end and a passageway open at one end to fluid within said pipe section, an annular pressure transmitting member disposed within said housing and adapted to fit around said pipe section, a sealing ring disposed within said housing and between said head and said pressure transmitting member, and means for moving said pressure transmitting member toward said head to deform the sealing ring and press its inner surface against the outer wall of the pipe section, said passageway communicating with the outer surfaces of said sealing ring to transmit fluid pressure within said pipe section to said sealing ring to supplement the pressure thereof against the outer wall of said pipe section.

JOHANN HAHN.

REFERENCES CITED

The following references are of record in the file of this patent:

UNITED STATES PATENTS

| Number | Name | Date |
| --- | --- | --- |
| 402,600 | Kemp | May 7, 1889 |
| 857,582 | Boyle | June 25, 1907 |
| 2,241,526 | Rosenkranz | May 13, 1941 |
| 2,299,116 | Svirsky | Oct. 30, 1942 |

FOREIGN PATENTS

| Number | Country | Date |
| --- | --- | --- |
| 19,943 | Great Britain | Oct. 23, 1893 |